May 20, 1947.  J. F. OWINGS  2,420,758
ANTI-SKID CHAIN
Filed June 15, 1945

INVENTOR
Joseph F. Owings
BY
ATTORNEY

Patented May 20, 1947

2,420,758

UNITED STATES PATENT OFFICE 2,420,758

ANTISKID CHAIN

Joseph F. Owings, Coulee City, Wash.

Application June 15, 1945, Serial No. 599,691

1 Claim. (Cl. 152—239)

This invention relates to non-skid chains for tires of automobiles, trucks, and other motor vehicles and it is one object of the invention to provide a chain formed of links so shaped and so connected with each other that they will rest flat against the tread portion of a tire and also present a flat surface to the street or other surface along which the vehicle is moving.

Another object of the invention is to provide a tire chain where inside chains include springs for taking up slack and holding the tire chain in close contacting engagement with the tread portion of a tire, ends of the side chains being connected by hooks which securely hold ends of the side chains together may be readily released when necessary.

Another object of the invention is to provide the tire chain with end links so formed that they may be pivotally connected with each other by a pin or rod which will not present a projection for making contact with the street and causing bumps as the wheel to which the tire chain is applied turns.

Another object of the invention is to so form links of the tire chain that slipping transversely as well as longitudinally will be very effectively prevented.

The invention is illustrated in the accompanying drawings wherein.

Figure 1:
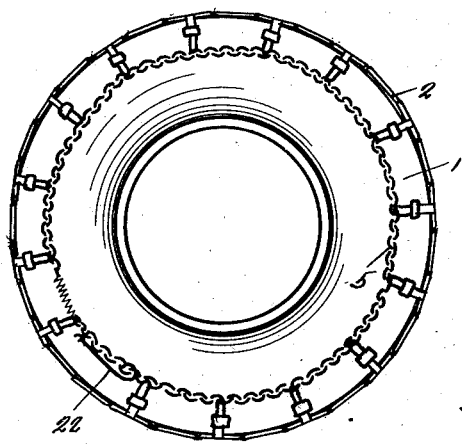
Fig. 1 is a side view showing the improved tire chain applied to a tire.
Figure 2:
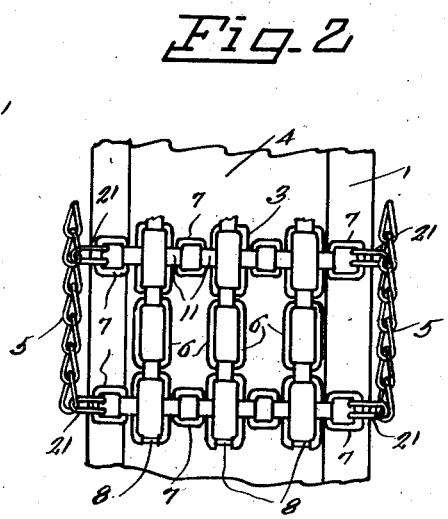
Fig. 2 is a plan view showing a fragment of the improved tire chain in place against the tire of a wheel.
Figure 3:
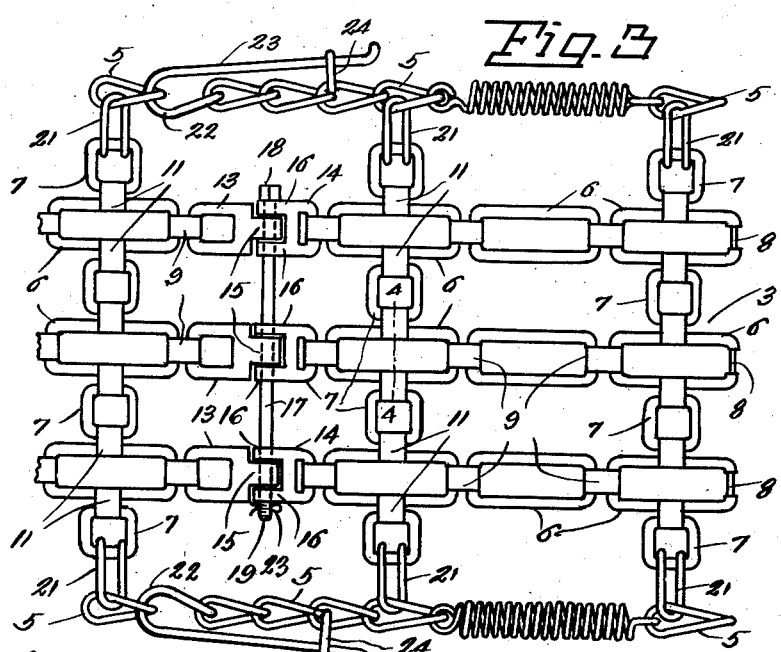
Fig. 3 is a fragmentary view upon an enlarged scale of the improved chain.
Figure 4:
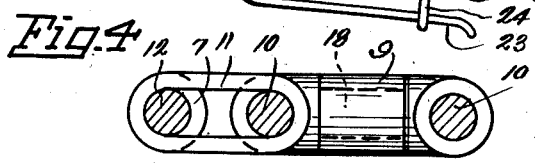
Fig. 4 is a sectional view upon an enlarged scale taken through adjoining links of the tire chain, the view being taken along the line 4—4 of Figure 3.

This improved tire chain is to be applied to the tire 1 of a wheel for an automobile or other motor vehicle and serve to prevent longitudinal or transverse slipping while traveling over streets or roads made slippery by ice, snow, or soft mud. The tire chain, which is indicated in general by the numeral 2, has a mat 3 of such length that it will extend about the tread surface 4 of the tire 1 and side chains 5 of such length that they will fit against side walls of the tire as shown in Figures 1 and 2. The mat 3 has longitudinally extending links 6 formed of steel or other strong metal, and cross links 7 formed of similar metal. These links 6 and 7 are of rectangular shape, the links 6 being oblong with their greatest length extending longitudinally of the mat and the links 7 being square. Ends of the links 6 have portions 8 of reduced diameter and about these portions 8 engage ends of links or bands 9 formed from strips of flat metal and every other link 6 of a row has its side portions reduced in thickness midway the length of the link to provide reduced portions 10 about which engage the straps or links 11 by means of which the links 6 are connected with the links 7. The links 7 have their side portions formed with reduced portions 12 to receive ends of the bands 11. Since the bands 9 and 11 are engaged about reduced portions of the links 6 and 7 outer surfaces of the bands will be flush with surfaces of the links and the ground-engaging surface of the mat and also its tire engaging surface will be smooth so that the tire will not be subjected to wear which would cause it to be quickly worn during use of the improved tire chain.

When the tire chain is applied to a tire ends of the mat must be connected with each other. In order to do so the mat is provided at one end with links 13 and at its other end with links 14. The links 13 are formed at their outer ends with ears 15 and the links 14 are formed with spaced ears 16 between which the ears 15 fit. These ears are formed with transversely extending openings to receive a pin or rod 17 having a head 18 at one end and its other end threaded, as shown at 19, so that a nut may be applied thereto, an opening being formed transversely through the threaded end of the pin to receive a cotter key 20. When the pin or rod 17 is in place the links 13 and 14 will be pivotally connected and the tire chain held circumferentially of the tire. The transversely extending links at opposite sides of the mat are engaged by hooks 21 which are U-shaped and loosely engaged through certain of the links of the side chains 5. These chains have springs 21 interposed in them to take up slack and hold the tire chain close against the tire and at one end each side chain carries a hook 22 having an elongated bill 23 so that when the hooks have been passed through links at the other end of the side chains the bills may be engaged through rings 24 and held against movement to a position in which the hooks may be disengaged from the links through which they pass. When it is desired to remove the tire chain from a wheel it is merely necessary to exert pull upon the side chains to expand the springs and the rings may be easily disengaged from bills of the hooks and the hooks then slipped through links of the chains. The pin 17 is then removed and the tire chain will be freed for removal from the tire about which it is mounted.

Having thus described the invention, what is claimed is:

An anti-skid chain for a tire of a length adapting it to extend about the tread portion of a tire, and comprising longitudinally extending rows of elongated links and short looped bands extending between the links with their ends loosely engaged about ends of the links, ends of the said links having portions reduced in thickness and constituting seats for end portions of said bands, short transverse links between certain of the longitudinal links midway ends thereof and of a width appreciably less than the length of the longitudinally extending links, confronting ends of the transverse links and sides of the longitudinally extending links having portions reduced in thickness, short looped bands extending between and loosely engaged about the reduced portions of the end portions of the transverse links and the confronting side portions of the adjoining longitudinally extending links, terminal links at ends of the rows or longitudinally extending rows of links having perforated ears, a pin passing transversely through the ears of all of the terminal links to pivotally connect the companion end links of each longitudinal row, side chains, hooks connecting said side chains with transverse links at opposite sides of the tire chain, and means for releasably connecting ends of the side chains with each other.

JOSEPH F. OWINGS.

REFERENCES CITED

The following references are of record in the file of this patent:

UNITED STATES PATENTS

| Number | Name | Date |
| --- | --- | --- |
| 1,099,454 | Kremer | June 9, 1914 |
| 922,739 | Weidner | May 25, 1909 |
| 1,244,080 | Reed | Oct. 23, 1917 |
| 1,263,926 | Rayburn | Apr. 23, 1918 |
| 1,375,201 | Baude | Apr. 19, 1921 |
| 1,517,875 | Von Ronzelen | Dec. 2, 1924 |

FOREIGN PATENTS

| Number | Country | Date |
| --- | --- | --- |
| 620,478 | Germany | 1934 |